(12) United States Patent
Benedetti et al.

(10) Patent No.: US 10,150,442 B2
(45) Date of Patent: Dec. 11, 2018

(54) INSERT MOLDED TETHERED FASTENER

(71) Applicant: Newfrey LLC, New Britain, CT (US)

(72) Inventors: Steven Michael Benedetti, Sterling Heights, MI (US); Grant Gerbasi Garrett, Rochester Hills, MI (US)

(73) Assignee: Newfrey LLC, New Britain, CT (US)

( * ) Notice: Subject to any disclaimer, the term of this patent is extended or adjusted under 35 U.S.C. 154(b) by 160 days.

(21) Appl. No.: 15/241,500

(22) Filed: Aug. 19, 2016

(65) Prior Publication Data

US 2016/0355154 A1   Dec. 8, 2016

Related U.S. Application Data

(62) Division of application No. 14/480,953, filed on Sep. 9, 2014, now Pat. No. 9,475,448.

(51) Int. Cl.

| | | |
|---|---|---|
| *B60R 21/216* | (2011.01) | |
| *B29C 45/14* | (2006.01) | |
| *F16B 5/06* | (2006.01) | |
| *F16B 2/22* | (2006.01) | |
| *F16B 2/08* | (2006.01) | |
| *F16B 21/07* | (2006.01) | |

(52) U.S. Cl.
CPC ...... *B60R 21/216* (2013.01); *B29C 45/14426* (2013.01); *B29C 45/14549* (2013.01); *B29C 45/14565* (2013.01); *F16B 5/0657* (2013.01); *F16B 2/08* (2013.01); *F16B 2/22* (2013.01); *F16B 5/065* (2013.01); *F16B 21/076* (2013.01)

(58) Field of Classification Search
CPC ............ B60R 21/216; B29C 45/14426; B29C 45/14549; B29C 45/14565; F16B 2/22; F16B 5/0657
See application file for complete search history.

(56) References Cited

U.S. PATENT DOCUMENTS

| | | |
|---|---|---|
| 1,270,494 A | 6/1918 | Christiansen |
| 2,426,975 A | 9/1947 | Roach |
| 4,398,317 A | 8/1983 | Schubring |

(Continued)

FOREIGN PATENT DOCUMENTS

| | | |
|---|---|---|
| DE | 19838069 A1 | 3/2000 |
| DE | 102006024529 | 11/2007 |

(Continued)

OTHER PUBLICATIONS

Extended European Search Report dated Feb. 9, 2016 in corresponding EP Patent Application No. 15183362.1.

*Primary Examiner* — Jason W San
(74) *Attorney, Agent, or Firm* — Harness, Dickey & Pierce, PLC (57) ABSTRACT

In accordance with a first aspect of the present disclosure, a motor vehicle airbag occupant restraint system fastener includes a metal clip, a first thermoplastic connector, a second thermoplastic connector, and a thermoplastic tether. The thermoplastic tether extends between the first and second thermoplastic connectors. Opposing ends of the thermoplastic tether are seamlessly integrated into the first and second thermoplastic connectors, respectively. The first and second thermoplastic connectors are formed of a first material and the thermoplastic tether is formed of a second material that is different from the first.

18 Claims, 5 Drawing Sheets

(56) References Cited

U.S. PATENT DOCUMENTS

| | | | |
|---|---|---|---|
| 4,698,882 A | 10/1987 | Lang | |
| 5,242,191 A * | 9/1993 | Faigle | B60R 21/215 |
| | | | 280/728.1 |
| 5,467,507 A | 11/1995 | Marsh et al. | |
| 5,975,820 A | 11/1999 | Kirchen | |
| 6,287,064 B1 | 9/2001 | Jhumra | |
| 6,394,695 B1 | 5/2002 | Chausset | |
| 6,431,585 B1 | 8/2002 | Rickabus et al. | |
| 6,471,276 B1 | 10/2002 | Brunsman et al. | |
| 6,863,855 B2 | 3/2005 | Shilale | |
| 7,077,449 B2 | 6/2006 | Tokunaga | |
| 7,155,783 B2 | 1/2007 | Nessel et al. | |
| 7,178,205 B2 * | 2/2007 | Nessel | B60R 13/0206 |
| | | | 24/289 |
| 7,178,850 B2 | 2/2007 | Smith et al. | |
| 7,290,795 B2 * | 11/2007 | Kawai | B60R 21/215 |
| | | | 24/297 |
| 7,338,068 B2 * | 3/2008 | Kawai | B60R 21/215 |
| | | | 24/297 |
| 7,454,826 B2 | 11/2008 | Nessel et al. | |
| 7,698,788 B2 * | 4/2010 | Hansen | B60R 21/213 |
| | | | 24/297 |
| 7,832,064 B2 | 11/2010 | Nessel et al. | |
| 8,046,880 B2 | 11/2011 | Katoh et al. | |
| 8,128,145 B2 * | 3/2012 | Smith | B60R 11/00 |
| | | | 296/29 |
| 8,316,514 B2 | 11/2012 | Sano | |
| 8,353,719 B2 | 1/2013 | Watts | |
| 8,480,120 B1 * | 7/2013 | Fukuda | B60R 13/0206 |
| | | | 24/453 |
| 8,510,918 B2 | 8/2013 | Shilale | |
| 8,844,992 B1 | 9/2014 | Noga et al. | |
| 9,056,593 B2 * | 6/2015 | Risdale | B60R 21/216 |
| 9,611,878 B2 * | 4/2017 | Benedetti | F16B 5/065 |
| 9,637,080 B2 * | 5/2017 | Ruthinowski | B60R 21/216 |
| 9,821,747 B2 * | 11/2017 | Benedetti | F16B 21/086 |
| 9,903,511 B2 * | 2/2018 | Vermillion | F16L 3/137 |
| 2002/0074776 A1 * | 6/2002 | Labrie | B60R 21/216 |
| | | | 280/728.3 |
| 2003/0178832 A1 | 9/2003 | Dominissini | |
| 2004/0119267 A1 * | 6/2004 | Cowelchuck | B60R 21/216 |
| | | | 280/728.3 |
| 2006/0032029 A1 * | 2/2006 | Nessel | B60R 13/0206 |
| | | | 24/289 |
| 2006/0032030 A1 * | 2/2006 | Nessel | B60R 13/0206 |
| | | | 24/289 |
| 2006/0239772 A1 * | 10/2006 | Kuroda | F16B 5/065 |
| | | | 403/329 |
| 2008/0235919 A1 * | 10/2008 | Giddings | B60R 13/0206 |
| | | | 24/289 |
| 2010/0199464 A1 | 8/2010 | Sano | |
| 2011/0079989 A1 * | 4/2011 | Baumgartner | B60R 21/213 |
| | | | 280/728.2 |

FOREIGN PATENT DOCUMENTS

| | | |
|---|---|---|
| WO | WO2009/039276 A1 | 3/2009 |
| WO | WO2012/074566 A1 | 6/2012 |

* cited by examiner

INSERT MOLDED TETHERED FASTENER

CROSS-REFERENCE TO RELATED APPLICATIONS

This application is a divisional of U.S. patent application Ser. No. 14/480,953 filed on Sep. 9, 2014. The entire disclosure of the above application is incorporated herein by reference.

FIELD

The present disclosure relates to fasteners used in a vehicle to join, and control the release of, a vehicle component during deployment of an occupant restraint system, and related manufacturing processes.

BACKGROUND

This section provides background information related to the present disclosure and is not necessarily prior art.

Clips and fasteners can be used to retain trim panels and other components (e.g., exterior moldings, mirrors, instrument panels, etc.) relative to a body portion of an automobile or other vehicle. In some instances, the fasteners can include a tether that controls the release or disengagement of the trim panel from the body portion. For example, in the event an air bag or other occupant restraint system is deployed, the trim panel can disengage from the body portion. The tether can help to control the movement of the trim panel (e.g., distance, direction, speed, etc.) relative to the body portion.

Known fasteners are designed for a specific application. This means that complex new molds must be created to accommodate even simple changes in the length of the tether. It would be desirable to provide a new fastener design and manufacturing method that permits the use of the same molds for multiple applications. It can also be desirable to provide the tether of different material or characteristics than the material of the fastener ends. In addition, the functionality of common fastener designs can be limited by packaging and space constraints within the vehicle.

SUMMARY

This section provides a general summary of the disclosure, and is not a comprehensive disclosure of its full scope or all of its features.

In accordance with a first aspect of the present disclosure, a motor vehicle airbag occupant restraint system fastener includes a metal clip, a first thermoplastic connector, a second thermoplastic connector, and a thermoplastic tether. The metal clip includes outwardly projecting spring arms for coupling to an aperture of an associated automobile body portion. The first thermoplastic connector includes a clip locking projection and a releasable fastening connector. The clip locking projection retains the metal clip on the first plastic connector. The second thermoplastic connector includes a panel locking projection and a cooperating releasable fastener. The panel locking projection couples the second thermoplastic connector to an associated trim panel of the automobile. The thermoplastic tether extends between the first and second thermoplastic connectors. Opposing ends of the thermoplastic tether are seamlessly integrated into the first and second thermoplastic connectors, respectively. The first and second thermoplastic connectors are formed of a first material and the thermoplastic tether is formed of a second material that is different from the first.

Upon deployment of an associated airbag, the outwardly projecting spring arms retain the metal clip within the aperture of the associated automobile body portion. The clip locking projection retains the metal clip on the first thermoplastic connector. The panel locking projection retains the associated trim panel on the second thermoplastic connector. The releasable fastening connector releases from the cooperating releasable fastener to allow the first and second thermoplastic connectors to move away from each other causing the tether to extend.

In accordance with another aspect of the present disclosure, a method of manufacturing a tethered fastener assembly is provided. The method includes selecting a length of a flexible tether that is not dictated by any mold cavity of a mold. The method also includes inserting a first end of the flexible tether into a first mold cavity of the mold. The method further includes inserting a second end opposite the first end of the flexible tether into a second mold cavity of the mold. In addition, the method includes molding a trim panel connector in the first mold cavity around the first end of the flexible tether, such that the flexible tether is integrally coupled to the first trim panel connector. The method also includes molding a body connector in the second mold cavity around the second end of the flexible tether, such that the flexible tether is integrally coupled to the first body connector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
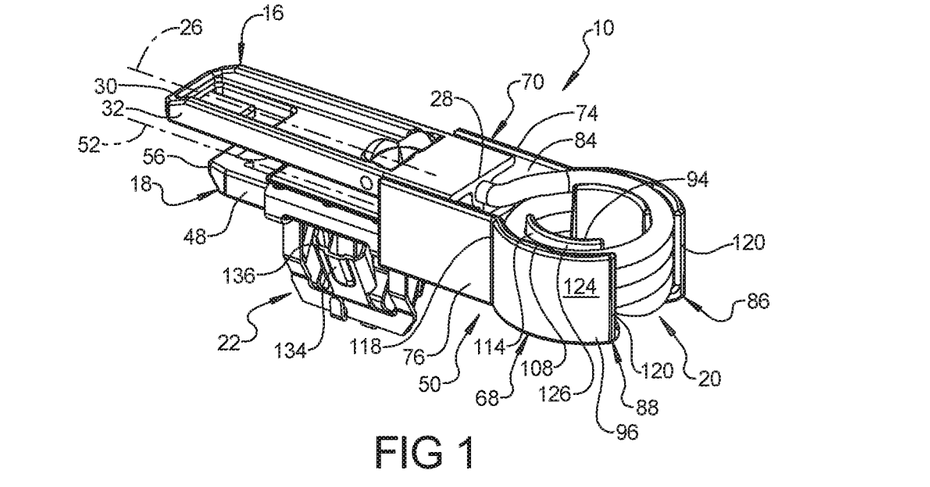
FIG. 1 is a perspective view an assembled insert molded tethered fastener in accordance with the principles of the present disclosure.
Figure 2:
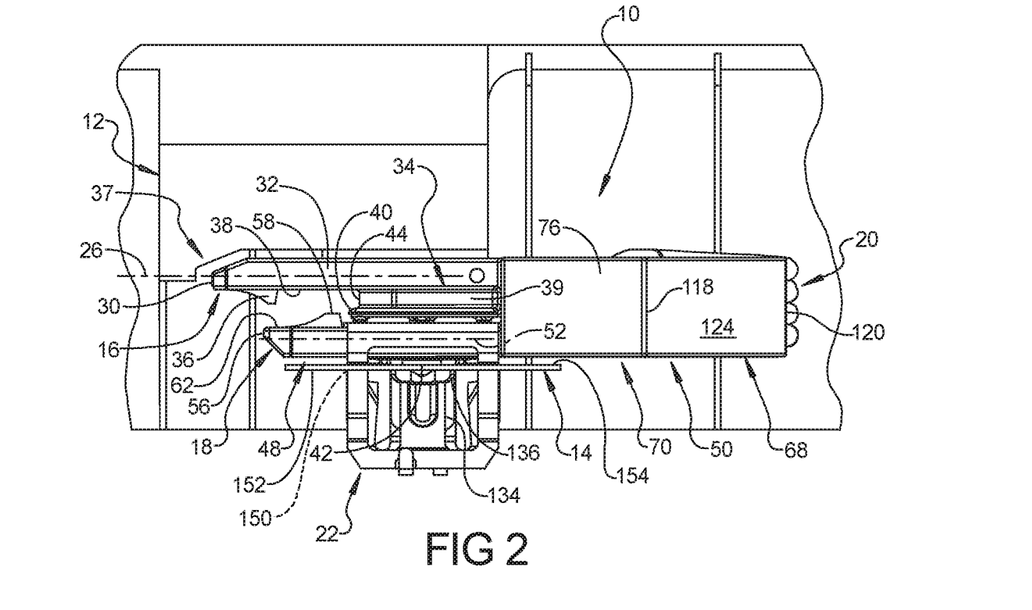
FIG. 2 is a side elevation view of the insert molded tethered fastener of FIG. 1 when joining components parts of a vehicle.

With initial reference to FIGS. 1-4, a tethered fastener assembly constructed in accordance with the present disclosure is illustrated and identified at reference character 10. As illustrated in FIG. 2, the tethered fastener assembly 10 may be used in an automobile (not shown) or other similar vehicle to join a first component 12 to a second component 14. According to one exemplary use, the first component 12 is a trim panel, and the second component 14 is a body portion of the automobile. It will be appreciated, however, that the present teachings may be adapted to join various components in the automobile.

The tethered fastener assembly 10 includes a first connector 16, a second connector 18, a tether 20, and a clip 22. As will be explained in more detail below, the tethered fastener assembly 10 can be formed, at least in part, by a molding process. In this regard, the first and/or second connector 16, 18 may be insert molded over or onto at least a portion of the tether 20 in an injection molding process.

The first connector 16 extends longitudinally along an axis 26 from a proximal end 28 to a distal end 30. As explained above, and will be explained in more detail below, the proximal end 30 is coupled to the tether 20. In this regard, the first connector 16 may be formed from a first material that is molded over a portion of the tether 20. The first material may be a thermoplastic material having a first chemical compound. In some configurations, the first material of the first connector 16 can be nylon 12, Hytrel®, or nylon 6-6, for example.

The first connector 16 includes a base portion 32 and a body portion 34. The base portion 32 extends from and between the proximal and distal ends 28, 30 and includes a projection or lock portion 36. The lock portion 36 is located near the distal end 30 and extends from a first or lower surface 38 (relative to the view in FIG. 3) of the base portion 32 in a direction substantially perpendicular to the axis 26. In an assembled configuration, the lock portion 36 may lock or otherwise secure the first connector 16 to the first component 12. In this regard, the first lock portion 36 may lock the first connector 16 to, or within, a doghouse portion 37 of the trim panel 12, as illustrated in FIG. 1.

The body portion 34 can be integrally and monolithically formed with the base portion 32 and can include a base 39, a flange or lip 40, and a first releasable fastener or fastening portion 42. The base 39 extends from the proximal end 28 along the axis 26, and further extends from the lower surface 38 of the base portion 32 in a direction substantially perpendicular to the axis 26. The lip 40 is formed around the periphery of the base 39, such that the lip 40 and the base portion 32 define a channel 44 therebetween. The first fastening portion 42 can include a post or stem 42a. The stem 42a extends from a first or lower surface 46 (relative to the view in FIG. 3) of the base 39 in a direction substantially perpendicular to the axis 26.

Figure 3:
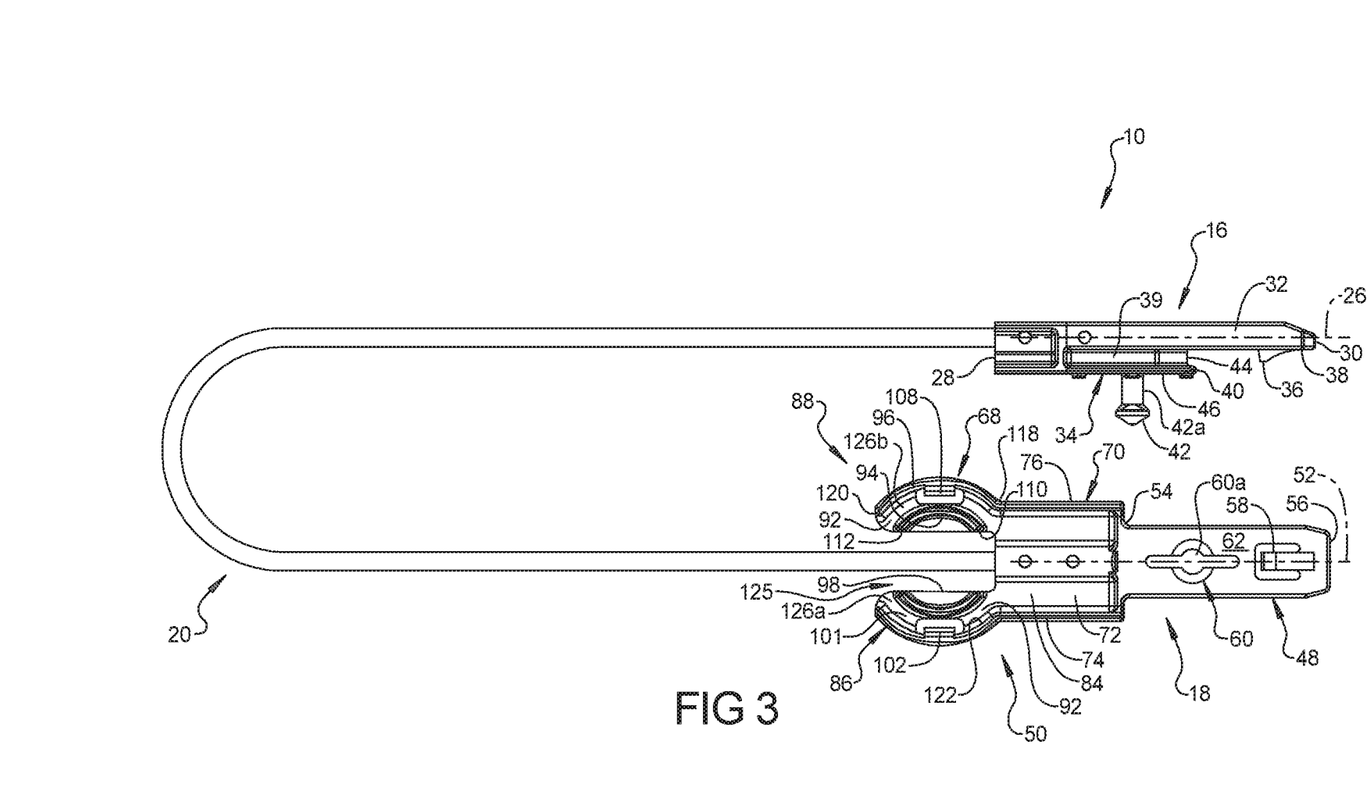
FIG. 3 is a top-side view of the insert molded tethered fastener of FIG. 1 in a partially assembled configuration.

The second connector 18 includes a tongue portion 48 and a cage portion 50. The tongue portion 48 extends longitudinally along an axis 52 from a distal end 54 to a proximal end 56, and includes a projection or lock portion 58, and a second releasable fastener or fastening portion 60. As explained above, and will be explained in more detail below, the distal end 54 of the tongue portion 48 can be coupled to the tether 20. In this regard, the second connector 16 may be formed from a second material that is molded over a portion of the tether 20. The second material may be a thermoplastic material having a second chemical compound. In some configurations, the second material may be the same as the first material. In some configurations, the second material of the second connector 18 can be nylon 12, Hytrel®, or nylon 6-6, for example. With reference to FIGS. 2 and 3, the lock portion 58 is located near the proximal end 56 and extends beyond, or is otherwise offset from, a first or upper surface 62 of the tongue portion 48 in a direction substantially perpendicular to the axis 52. As will be explained in more detail below, in an assembled configuration, the lock portion 58 may secure or otherwise retain the clip 22 relative to the second connector 18. The second fastening portion 60 can include an aperture 60a disposed between the proximal and distal ends 56, 54 of the tongue portion 48.

The cage portion 50 can define a racquet-shaped profile including a proximal end portion 68 and a distal end portion 70. The distal end portion 70 is coupled to the distal end 54 of the tongue portion 48 and extends longitudinally along the axis 52. In this regard, the cage portion 50 can be integrally and monolithically formed with tongue portion 48.

Figure 4:
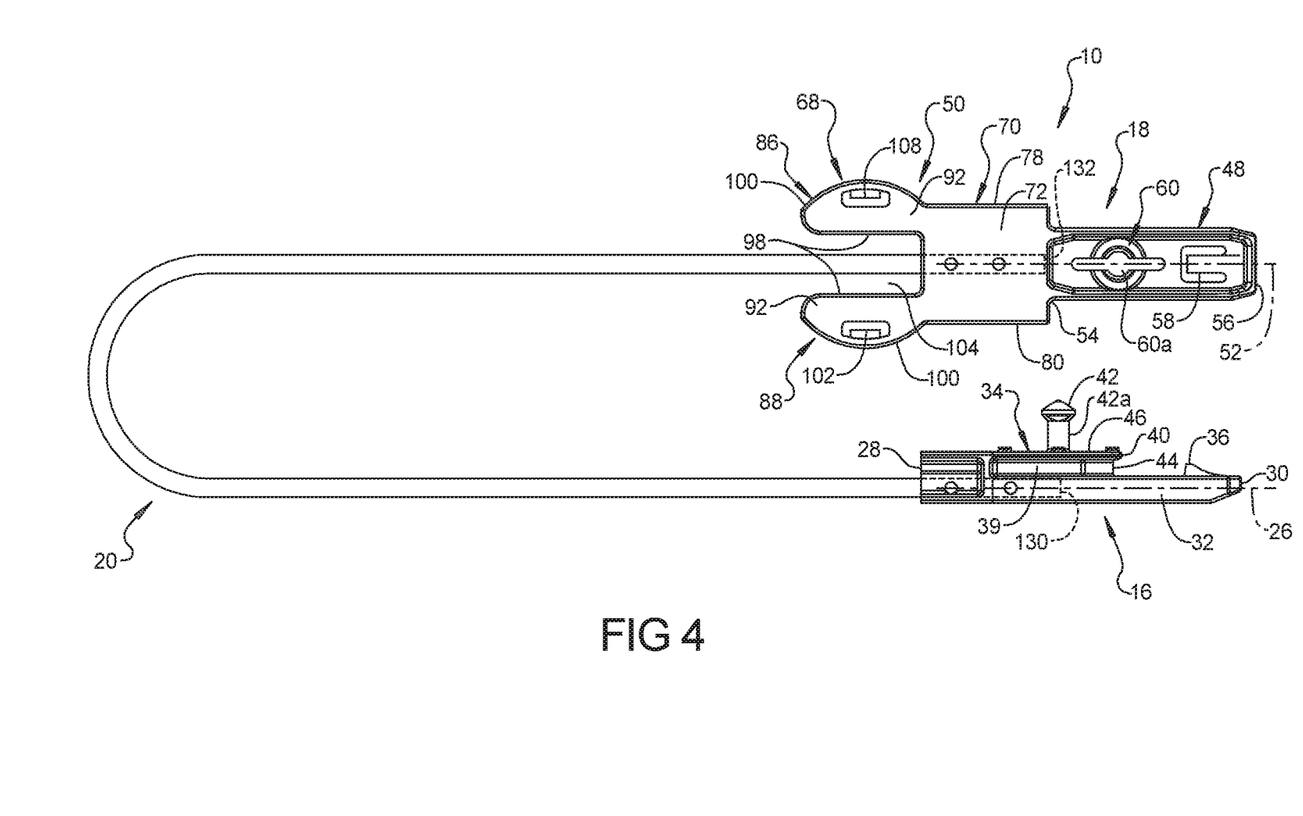
FIG. 4 is a bottom-side view of the insert molded tethered fastener of FIG. 1 in a partially assembled configuration.

The distal end portion 70 includes a base 72, a first wall or flange 74, and a second wall or flange 76. The base 72 defines a substantially rectangular shape in a plane extending substantially parallel to the upper surface 62 of the tongue portion 48. In this regard, as illustrated in FIG. 4, the base 72 includes a first lateral edge 78 extending in a direction substantially parallel to the axis 52, and a second lateral edge 80, opposite the first lateral edge, extending in a direction substantially parallel to the axis 52.

The first flange 74 extends from the first lateral edge 78 of the base 72 in a direction substantially perpendicular to the axis 52. The second flange 76 extends from the second lateral edge 80 of the base 72 in a direction substantially perpendicular to the axis 52. In this regard, the first flange 74 can be substantially parallel to the second flange 76, such that the first and second flanges 74, 76 define a space or void 84 therebetween. The void 84 can have a substantially cuboid or right-angled parallelepiped shape.

The proximal portion 68 includes a first leg 86 and a second leg 88. The first and second legs 86, 88 define a substantially fork-shaped construct. The first leg 86 may be substantially similar to the second leg 88. Accordingly, except as otherwise provided, references herein to the first leg 86 will be understood to include both the first and second legs 86, 88, and like reference numerals will be used to describe like features and components.

The first leg 86 includes a base 92, a first (or inner) wall or flange 94 and a second (or outer) wall or flange 96. As illustrated in FIGS. 3 and 4, the base 92 of the first leg 86 extends from, and is integrally formed with, the base 72 of the distal end portion 70 and includes a first or inner lateral edge 98, a second or outer lateral edge 100, and a tether retention feature 102. The inner lateral edge 98 extends in a direction substantially parallel to the axis 52, such that the inner lateral edge 98 of the first leg 86 and the inner lateral edge 98 of the second leg 88 define a void 104 (FIG. 4) having a substantially rectangular shape or profile. The outer lateral edge 100 extends arcuately, such that the outer lateral edge 100 of the first leg 86 and the outer lateral edge 100 of the second leg 88 can define a portion of a circle. The tether retention feature 102 includes a detent 108 extending from an upper portion or edge (relative to the view in FIG. 1) of outer flange 96.

As illustrated in FIGS. 1 and 3, the inner flange 94 extends from the base 92 and includes a first end 110, a second end 112, and an outer surface 114. The first and second ends 110, 112 can be aligned with the inner lateral edge 98 of the base 92. The inner flange 94 can define a portion of a cylinder. In this regard, the outer surface 114 can extend from the base 92 in a direction substantially perpendicular to the base 92, and can define a convex profile. The outer surface 114 of the inner flange 94 of the first leg 86 can be concentric to the outer surface 114 of the inner flange 94 of the second leg 88.

With reference to FIGS. 1 and 3, the outer flange 96 extends from the base 92 and includes a first end 118, a second end 120, an inner surface 122 and an outer surface 124. The first end 118 can be adjacent to, or otherwise integrally formed with, the first flange 74 of the distal end portion 70. The second end 120 of the outer flange 96 of the first leg 86, and the second end 120 of the outer flange 96 of the second leg 88 define a void or gap 125 therebetween. The outer flange 96 can define a portion of a cylinder, such that the outer flange 96 is concentric to the outer surface 114 of the inner flange 94. In this regard, the inner surface 122 of the outer flange 96 includes a concave profile, while the outer surface 124 of the outer flange 96 includes a convex profile. The inner and outer surfaces 122, 124 of the inner and outer flanges 94, 96, respectively, define a void or cage 126 therebetween, including a first cage portion 126a aligned with the first leg 86, and a second cage portion 126b aligned with the second leg 88.

Figure 5:
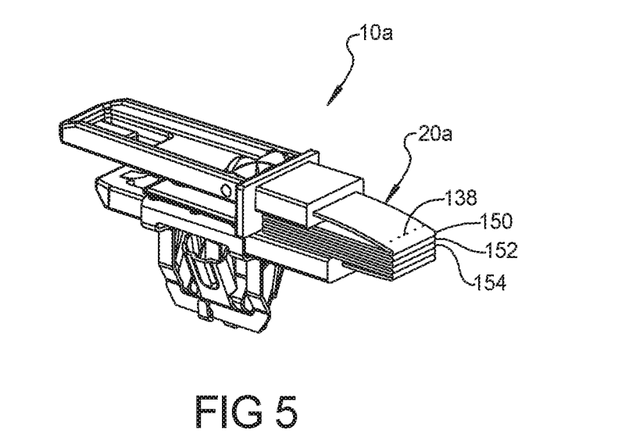
FIG. 5 is a perspective view of another assembled insert molded tethered fastener in accordance with the principles of the present disclosure.
Figure 6:
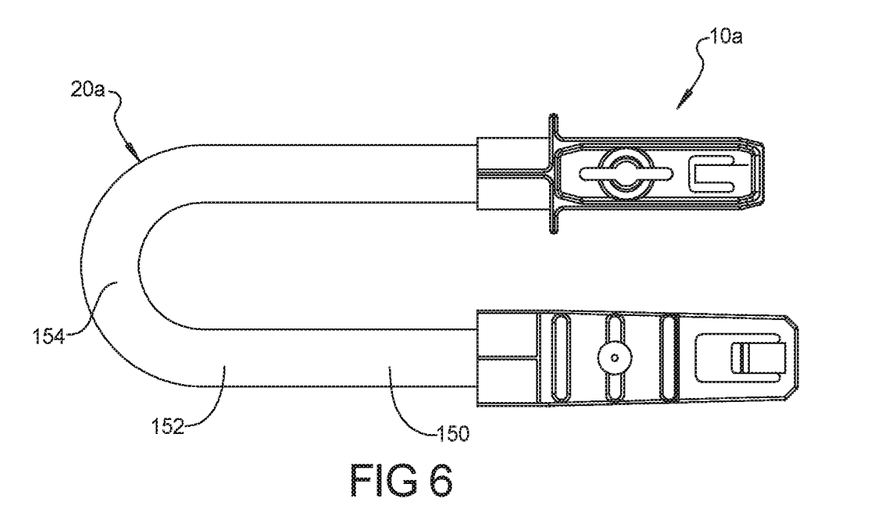
FIG. 6 is a top view of the insert molded tethered fastener of FIG. 5 in a partially assembled configuration.

The tether 20 may be a flexible member extending from and between a first end 130 and a second end 132. In some configurations, the tether 20 may include a cord, string or rope (FIGS. 1-4). In other configurations, a tether 20a may include a strap, band, or other substantially flat tether (FIGS. 5-6). In this regard, the tether 20 may be formed from a third material that is different than the first and second materials of the first and second connectors 16, respectively. The third material may be a thermoplastic material, such as a woven thermoplastic material, for example, or other thermoplastic material having a third chemical compound different than the first and second chemical compounds. In some configurations, the third material can include nylon. In other configurations, the third material of the tether 20 can include nylon 6 or nylon 6-6, for example.

The clip 22 may be coupled to or otherwise supported by the second connector 18. As illustrated in FIG. 1, in some configurations, the clip 22 can be coupled to the tongue portion 48, such that the clip 22 is secured, or otherwise located, between the lock portion 58 and the cage portion 50. The clip 22 may include a pair of opposed outwardly projecting arms 134. The clip 22 may be formed from a resilient or flexible material, such that the arms 134 can be biased relative to the clip 22. In this regard, the clip 22 may be formed from a metallic material, such as spring steel or a steel alloy, for example. As illustrated in FIG. 2, the arm 134 includes a stop surface 136 at the distal end thereof. As will be explained in more detail below, in an assembled configuration, the stop surface 136 abuts the second component 14 to secure the clip 22 and the second connector 18 to the second component. A further discussion of the clip 22, including various configurations and functions thereof, may be found in commonly owned U.S. Pat. No. 7,454,826, entitled "Method of Manufacturing Multiple Engagement Joint Tethered Fastener," which is hereby incorporated by reference in its entirety.

Figure 7:
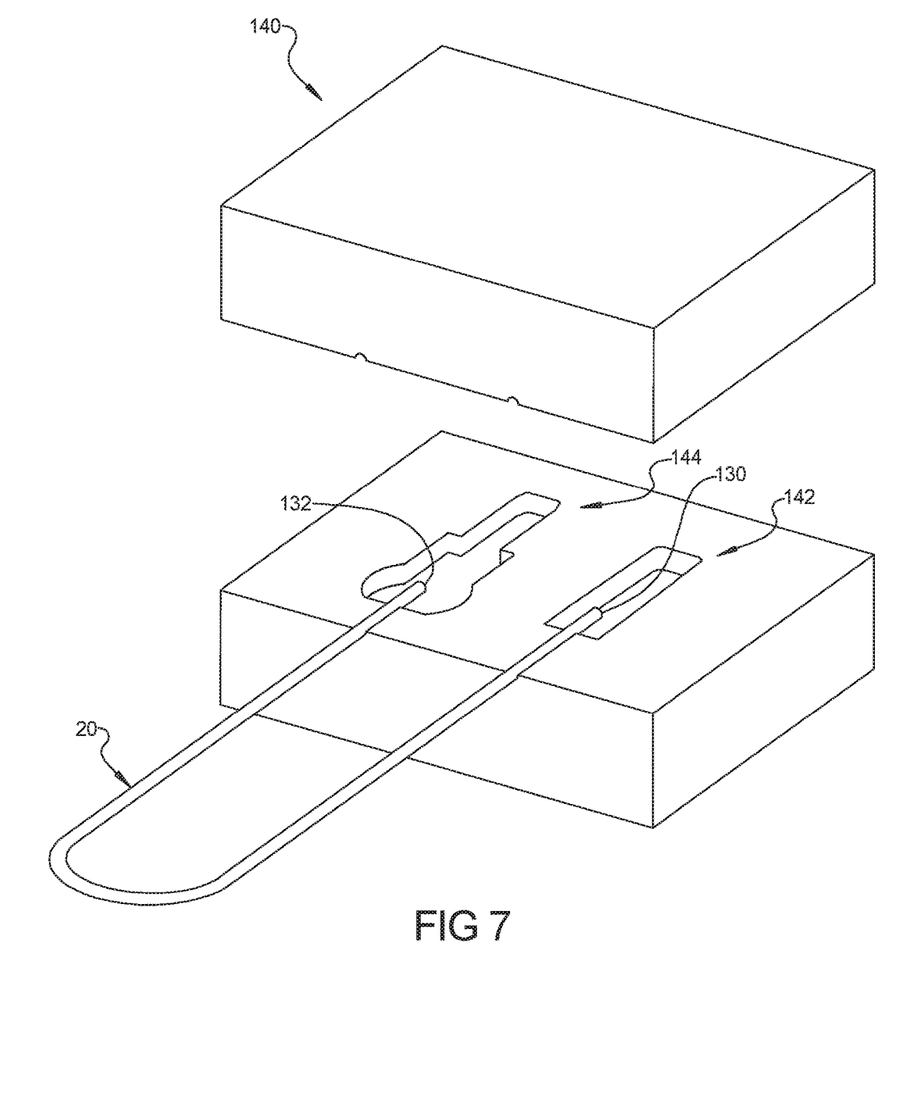
FIG. 7 is a perspective view of a mold for manufacturing the insert molded tethered fastener of FIG. 1.

A method of manufacturing a first tethered fastener assembly 10 can include providing a mold 140 having a first mold cavity 142 for molding the first connector 16, and a second mold cavity 144 for molding the second connector 18. The mold 140 can be suitable for an injection or insert molding process. The user can select a first tether 20 having a first length. The first length is independent of, and is otherwise not dictated by, the mold 140 or either of the first and second mold cavities 142, 144. The first end 130 of the first tether 20 can be placed and secured within the first mold cavity 142, and the second end 132 of the first tether 20 can be placed and secured within the second mold cavity 144. An injection molding process can then be used to form the tethered fastener assembly 10, including the first tether 20 having the first length. In this regard, the first and second materials of the first and second connectors 16, 18, respectively, can be insert molded over the first and second ends 130, 132 of the first tether 20 having the first length. Specifically, the proximal end 28 of the first connector 16 can be molded over the first end 130 of the first tether 20, and the distal end portion 70 of the cage portion 50 can be molded over the second end 132 of the first tether 20, such that the first tether 20 extends from the distal end portion 70 and through the void 104. In this regard, the first end 130 of the tether 20 can be seamlessly integrated with the first connector 16, and the second end 132 of the tether 20 can be seamlessly integrated with the second connector 18.

It will be appreciated that, by molding the first and/or second connector 16, 18 over the first and and/or second ends 130, 132 of the tether 20, a user can pre-select or otherwise customize the length of the tether 20 prior to completing the molding process described above. Accordingly, a method of manufacturing a second tethered fastener assembly 10 can include providing the mold 140 having the first mold cavity 142 and the second mold cavity 144. The user can select a second tether 20 having a second length that is greater or less than the first length of the first tether 20. The first end 130 of the second tether 20 can be placed and secured within the first mold cavity 142, and the second end 132 of the second tether 20 can be placed and secured within the second mold cavity 144. An injection molding process can then be used to form the second tethered fastener assembly 10, including the tether 20 having the second length. In this way, the first tethered fastener assembly 10 including the first tether 20 having the first length, and the second tethered fastener assembly 10 including the second tether 20 having the second length, can be manufactured in the same mold 140.

As illustrated in FIG. 1, in an assembled configuration, the tether 20 can be disposed within the cage 126, allowing the tethered fastener assembly 10 to assume a compact, or otherwise small, shape in the assembled configuration. In this regard, the tether 20 can be coiled or otherwise wrapped around the inner flanges 94 of the first and second legs 86, 88, such that the tether 20 is disposed between the inner and outer flanges 94, 96 of the first and second legs 86, 88.

The first connector 16 can be disposed between the first and second flanges 74, 76, such that the first end 130 of the tether 20 is substantially aligned with the second end 132 of the tether 20. The first fastening portion 42 of the first connector 16 can be coupled to the second fastening portion 60 of the second connector 18. Accordingly, the second fastening portion 60 may be referred to as a cooperating releasable fastener, or cooperating fastening portion 60, herein. In this regard, the stem 42a can be disposed within the aperture 60a of the second connector 18 to secure the first connector 16 to the second connector 18.

As illustrated in FIG. 2, in the assembled configuration, the first connector 16 can be coupled to the first component 12, or trim panel portion, of the automobile. In this regard, the first connector 16 may be referred to as a trim panel connector 16 herein. The second connector 18, including the clip 22, can be coupled to the second component 14, or body portion, of the automobile. In this regard, the second connector 18 may be referred to as a body connector 18 herein. The clip 22 may be positioned in an aperture 150 of the second component 14, such that the arms 134 are located on a first side 152 of the second component 14, and the second connector 18 is located on a second side 154 of the second component 14. In this regard, the stop surface 136 may abut the first side 152 of the second component 14 to retain the clip 22 within the aperture 150.

During a deployment of the airbag or other supplemental restraint system, the first fastening portion 42 of the first connector 16 can disengage from the second fastening portion 60 of the second connector 18, to allow the second component 14 to disengage and move away from the first component 12. In this regard, the arms 134 may secure the clip 22 to the second component 14, and the lock portion 58 may secure the clip 22 to the second connector 18. As the second component 14 moves away from the first component 12, the tether 20 can extend by unwinding or unwrapping from the cage portion 50 of the second connector, such that the tether 20 can absorb the kinetic energy of the second component 14 in order to control the movement (e.g., distance and direction of travel, velocity, acceleration, etc.) of the first component 12 relative to the second component 14 during deployment of the airbag.

With reference to FIGS. 5 and 6, another configuration of a tethered fastener assembly 10*a* is shown. The structure, function and method of manufacturing the tethered fastener assembly 10*a* may be generally similar to that of the tethered fastener assembly 10, apart from any exceptions described below and/or shown in the figures. Therefore, the structure, function and/or method of manufacturing the tethered fastener assembly 10*a* will only be described herein with respect to the differences relative to the tethered fastener assembly 10. In addition, like reference numerals are used hereinafter and in the drawings to identify like components, while like reference numerals containing letter extensions are used to identify those components that have been modified.

The tethered fastener assembly 10*a* includes a tether 20*a* having a first portion 150, a second portion 152, and a third portion 154. It will also be appreciated that the tether 20*a* can include more or less than three portions 150, 152, 154 within the scope of the present disclosure. In an assembled configuration, at least a portion of the first, second and/or third portions 150, 152, 154 can overlie at least a portion of another of the first, second and/or third portions 150, 152, 154. In this regard, the tether 20*a* can be layered or folded into an accordion like configuration, as illustrated in FIG. 5. A stitch 138, adhesive, or other similar fastening technique can be used to hold the tether 20*a* in the configuration illustrated in FIG. 5, such that the first, second and/or third portion 150, 152, 154 is secured to at least one of another of the first, second and third portions 150, 152, 154.

During a deployment of the airbag or other supplemental restraint system, the second component 14 can disengage and move away from the first component 12, as described above. As the second component 14 moves away from the first component 12, the first, second and/or third portion 150, 152, 154 is can separate from at least one of another of the first, second and third portions 150, 152, 154. In this regard, the stitch 138 can tear, thus allowing at least one of the portions 150, 152, 154 to separate from at least another of the portions 150, 152, 154, such that the tether 20*a* can absorb the kinetic energy of the second component 14 in order to control the movement (e.g., distance and direction of travel, velocity, acceleration, etc.) of the first component 12 relative to the second component 14 during deployment of the airbag. By absorbing the energy of the second component 14, the tether 10*a* can help to ensure the structural integrity of, and prevent any fracturing or other damage to, the first and/or second components 12, 14 during a deployment event.

Example embodiments are provided so that this disclosure will be thorough, and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only, and is not intended to be limiting. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A motor vehicle airbag occupant restraint system fastener, the fastener comprising:
   a metal clip including outwardly projecting spring arms for coupling to an aperture of an associated automobile body portion;
   a first thermoplastic connector having a clip locking projection retaining the metal clip on the first plastic connector, and the first thermoplastic connector having a releasable fastener;
   a second thermoplastic connector having a panel locking projection for coupling the second thermoplastic connector to an associated trim panel of the automobile, and the second thermoplastic connector having a cooperating releasable fastener; and
   a thermoplastic tether extending between the first and second thermoplastic connectors, and opposing ends of the thermoplastic tether extending internally into and being seamlessly integrated into the first and second thermoplastic connectors, respectively;
   wherein the first and second thermoplastic connectors are formed of a first material and the thermoplastic tether is formed of a second material that is different from the first;
   wherein, upon deployment of an associated airbag, the outwardly projecting spring arms retain the metal clip within the aperture of the associated automobile body portion, the clip locking projection retains the metal clip on the first thermoplastic connector, the panel locking projection retains the associated trim panel on the second thermoplastic connector, and the releasable fastening connector releases from the cooperating releasable fastener to allow the first and second thermoplastic connectors to move away from each other causing the tether to extend.

2. The motor vehicle airbag occupant restraint system fastener of claim 1, wherein the first material is different from the second material in that the second thermoplastic material is a woven thermoplastic material.

3. The motor vehicle airbag occupant restraint system fastener of claim 1, wherein the first material is different from the second material in that the second thermoplastic material is a different chemical compound that the first thermoplastic material.

4. The motor vehicle airbag occupant restraint system fastener of claim 1, wherein the first material is selected from a group consisting of nylon 12 and Hytrel®, and the second material is selected from a group consisting of nylon 6 and nylon 6-6.

5. The motor vehicle airbag occupant restraint system fastener of claim 1, wherein the second material is a nylon material.

6. The motor vehicle airbag occupant restraint system fastener of claim 1, wherein the first thermoplastic connector includes a cage portion, the cage portion including first and second flanges having first and second outer surfaces, respectively, and wherein the thermoplastic tether is wrapped around the first and second flanges, such that the thermoplastic tether is adjacent to the first and second outer surfaces.

7. The motor vehicle airbag occupant restraint system fastener of claim 6, wherein the first and second outer surfaces are convex.

8. The motor vehicle airbag occupant restraint system fastener of claim 6, wherein the cage portion further includes third and fourth flanges, the first and third flanges defining a first cage space therebetween, and the second and fourth flanges defining a second cage space therebetween, and wherein the thermoplastic tether is positioned within the first and second cage spaces when the thermoplastic tether is wrapped around the first and second flanges.

9. The motor vehicle airbag occupant restraint system fastener of claim 1, wherein the thermoplastic tether includes a coiled configuration in which adjacent coiled portions of the thermoplastic tether are in contacting face-to-face relationship.

10. The motor vehicle airbag occupant restraint system fastener of claim 1, wherein the thermoplastic tether includes a folded configuration in which adjacent folded portions of the thermoplastic tether are in contacting face-to-face relationship.

11. A motor vehicle airbag occupant restraint system fastener, the fastener comprising:
a metal clip including outwardly projecting spring arms for coupling to an aperture of an associated automobile body portion;
a first thermoplastic connector having a clip locking projection retaining the metal clip on the first plastic connector, and the first thermoplastic connector having a releasable fastener;
a second thermoplastic connector having a panel locking projection for coupling the second thermoplastic connector to an associated trim panel of the automobile, and the second thermoplastic connector having a cooperating releasable fastener; and
a thermoplastic tether extending between the first and second thermoplastic connectors, and opposing ends of the thermoplastic tether being seamlessly integrated into the first and second thermoplastic connectors, respectively;
wherein the first and second thermoplastic connectors are formed of a first material and the thermoplastic tether is formed of a second material that is different from the first;
wherein the thermoplastic tether has a folded configuration in which stitching through the thermoplastic tether retains adjacent folded portions of the thermoplastic tether in contacting face-to-face relationship and, in the folded configuration, the thermoplastic tether having an overall pre-deployed length, and wherein the thermoplastic tether has a deployed configuration in which the stitching releases the adjacent folded portions of the thermoplastic tether allowing the adjacent folded portions to separate from the contacting face-to-face relationship and, in the deployed configuration, the thermoplastic tether having an overall deployed length that is greater than the overall pre-deployed length;
wherein, upon deployment of an associated airbag, the outwardly projecting spring arms retain the metal clip within the aperture of the associated automobile body portion, the clip locking projection retains the metal clip on the first thermoplastic connector, the panel locking projection retains the associated trim panel on the second thermoplastic connector, and the releasable fastening connector releases from the cooperating releasable fastener to allow the first and second thermoplastic connectors to move away from each other causing the stitching to release the tether from its folded configuration and allowing the thermoplastic tether to move into the deployed configuration.

12. The motor vehicle airbag occupant restraint system fastener of claim 11, wherein the folded configuration comprises an accordion configuration.

13. The motor vehicle airbag occupant restraint system fastener of claim 11, wherein the opposing ends of the thermoplastic tether extend internally into the first and second thermoplastic connectors, respectively.

14. The motor vehicle airbag occupant restraint system fastener of claim 11, wherein the first and second thermoplastic connectors are formed of a first material and the thermoplastic tether is formed of a second material that is different from the first material.

15. The motor vehicle airbag occupant restraint system fastener of claim 14, wherein the first material is different from the second material in that the second thermoplastic material is a woven thermoplastic material.

16. The motor vehicle airbag occupant restraint system fastener of claim 14, wherein the first material is different from the second material in that the second thermoplastic material is a different chemical compound than the first thermoplastic material.

17. The motor vehicle airbag occupant restraint system fastener of claim 14, wherein the first material is selected from a group consisting of nylon 12 and Hytrel®, and the second material is selected from a group consisting of nylon 6 and nylon 6-6.

18. The motor vehicle airbag occupant restraint system fastener of claim 14, wherein the second material is a nylon material.

\* \* \* \* \*

UNITED STATES PATENT AND TRADEMARK OFFICE
CERTIFICATE OF CORRECTION

PATENT NO. : 10,150,442 B2
APPLICATION NO. : 15/241500
DATED : December 11, 2018
INVENTOR(S) : Steven Michael Benedetti et al.

Page 1 of 1

It is certified that error appears in the above-identified patent and that said Letters Patent is hereby corrected as shown below:

In the Claims

Column 9, Claim 3, Line 6, delete "that" and insert --than-- therefor

Signed and Sealed this
Fifth Day of March, 2019

Andrei Iancu
*Director of the United States Patent and Trademark Office*